United States Patent
Silva et al.

(10) Patent No.: US 11,772,824 B1
(45) Date of Patent: Oct. 3, 2023

(54) SYSTEMS AND METHODS FOR HYBRID LUNAR SURFACE AND SPACE DOMAIN SITUATIONAL AWARENESS

(71) Applicant: Ball Aerospace & Technologies Corp., Boulder, CO (US)

(72) Inventors: Elvis Dariel Silva, Arvada, CO (US); Jeffrey Edward Van Cleve, Longmont, CO (US); Robert Hadley Philbrick, Erie, CO (US); Christopher Joseph Grant, Denver, CO (US); Jacob Daniel Griesbach, Longmont, CO (US); Michael Patrick Mahoney, Broomfield, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 15 days.

(21) Appl. No.: 17/344,236

(22) Filed: Jun. 10, 2021

Related U.S. Application Data

(60) Provisional application No. 63/037,333, filed on Jun. 10, 2020.

(51) Int. Cl.
  *B64G 1/10* (2006.01)
  *B64G 1/24* (2006.01)

(52) U.S. Cl.
  CPC .......... *B64G 1/105* (2013.01); *B64G 1/1085* (2013.01); *B64G 1/242* (2013.01); *B64G 2001/1057* (2013.01)

(58) Field of Classification Search
  CPC ...... B64G 1/105; B64G 1/1085; B64G 1/242; B64G 2001/1057; B64G 1/1021
  See application file for complete search history.

(56) References Cited

U.S. PATENT DOCUMENTS

| | | | |
|---|---|---|---|
| 5,582,367 A | 12/1996 | Castiel et al. | |
| 5,669,585 A | 9/1997 | Castiel et al. | |
| 7,669,803 B2 | 3/2010 | Goodzeit | |
| 8,240,611 B2 * | 8/2012 | Vance | B64G 1/1021 701/13 |
| 9,100,545 B2 | 8/2015 | Vampola et al. | |
| 9,106,857 B1 * | 8/2015 | Faramarzpour | H04N 5/361 |

(Continued)

OTHER PUBLICATIONS

Lepage et al. "Time-Delay-Integration Architectures in CMOS Image Sensors," IEEE Transactions on Electron Devices, Nov. 2009, vol. 56, No. 11, pp. 2524-2533.

(Continued)

*Primary Examiner* — Medhat Badawi
*Assistant Examiner* — Vicente Rodriguez
(74) *Attorney, Agent, or Firm* — Sheridan Ross P.C.

(57) ABSTRACT

Systems and methods for obtaining images of a lunar surface and cislunar space using a hybrid telescope are provided. One hybrid telescope is carried by each of two spacecraft. Each spacecraft is in an elliptical orbit about the Moon. The periapsides of the spacecraft orbits are 180° apart from one another. In addition, the spacecraft can be phased 180° apart from one another to enable an offset in access times of each telescope to the cislunar and surface domains respectively. The image sensors associated with the telescopes can include a staring mode for collecting images from cislunar space, and a scanning mode for collecting images from the lunar surface.

20 Claims, 10 Drawing Sheets

(56) References Cited

U.S. PATENT DOCUMENTS

| | | | |
|---|---|---|---|
| 9,344,182 B2 | 5/2016 | Bigras et al. | |
| 10,364,051 B1 | 7/2019 | Turner | |
| 10,843,822 B1 | 11/2020 | Herman et al. | |
| 10,863,125 B2 | 12/2020 | Durand | |
| 10,875,668 B2 * | 12/2020 | Bigras | B64G 1/242 |
| 10,958,859 B2 | 3/2021 | Zuleta et al. | |
| 2004/0211864 A1 * | 10/2004 | Less | H04B 7/195 |
| | | | 244/158.4 |
| 2009/0303110 A1 * | 12/2009 | Gregory | G01S 13/90 |
| | | | 342/25 A |
| 2015/0120096 A1 * | 4/2015 | Coleman | B64G 3/00 |
| | | | 701/13 |
| 2020/0333140 A1 * | 10/2020 | Elson | G01S 13/89 |

OTHER PUBLICATIONS

Levski et al. "On Noise in Time Delay Integration CMOS Image Sensors," Proc. SPIE 9891, Silicon Photonics and Photonic Integrated Circuits V, May 2016, vol. 9891, Article 989122, 12 pages.
Whitley et al. "Options for Staging Orbits in Cis-Lunar Space," NASA, Oct. 21, 2015, 9 pages.

* cited by examiner

SYSTEMS AND METHODS FOR HYBRID LUNAR SURFACE AND SPACE DOMAIN SITUATIONAL AWARENESS

CROSS-REFERENCE TO RELATED APPLICATIONS

This application claims the benefit of U.S. Provisional Patent Application Ser. No. 63/037,333, filed Jun. 10, 2020, the entire disclosure of which is hereby incorporated herein by reference.

FIELD

Systems and methods utilizing spacecraft in high eccentricity orbits, each carrying a sensor having a single hybrid telescope design to facilitate imaging of the lunar surface and lunar space domain, are provided.

BACKGROUND

As the space beyond geosynchronous and near lunar orbit becomes more crowded and competitive by space faring nations and private companies, it is important to extend space domain awareness responsibilities to include the lunar space and lunar surface regimes. Cis-lunar space domain awareness is an area of increasing interest to both governments and commercial entities. In addition, monitoring of the lunar surface is of interest for determining the rate of meteoroid impacts and characterizing anthropogenic activity. Such monitoring can be performed using Earth based instruments, instruments placed on the surface of the Moon itself, or from vehicles orbiting the moon. Positioning a sensor system on an orbiting spacecraft, among other advantages, offers the potential to monitor both lunar space and the lunar surface. However, the differing requirements associated with monitoring the different domains, including different instrument fields of view and imager capabilities, have required that a different instrument be used for each task. In addition, the different preferred vantage points for monitoring the different domains have made it difficult for systems to provide continuous and complete monitoring of the different domains.

In particular, supporting lunar space and lunar surface domain awareness has required the design and use of intrinsically distinct payloads with different operation modes and techniques. For lunar space domain awareness, the instrument preferably is capable of detecting and tracking very dim objects over large areas and distances. For lunar surface imaging, the instrument is preferably capable of obtaining detailed images at relatively close range. Accordingly, the problems of providing cislunar space domain awareness and lunar surface domain awareness have been addressed using distinct instruments and platforms.

SUMMARY

In accordance with embodiments of the present disclosure, systems and methods for monitoring the cislunar space domain and the lunar surface domain are provided. More particularly, embodiments of the present disclosure provide an integrated observation system for monitoring the cislunar space domain and the lunar surface domain that includes a common instrument design, hereinafter referred to as a hybrid sensor, for monitoring the different domains. Moreover, embodiments of the present disclosure provide continuous or nearly continuous monitoring of the cislunar space domain and frequent access to the lunar surface domain by providing a pair of spacecraft in high eccentricity orbits and phased at or about 180 degrees apart from one another (where about is +/−10%), with each spacecraft in the pair carrying an instance of the hybrid sensor or instrument.

The hybrid sensor or instrument generally includes telescope optics, a focal plane array, and a controller. The hybrid sensor is carried by a spacecraft in a highly eccentric orbit about the Moon. The hybrid sensor is a single instrument design having an electro-optic (EO) signal chain that is capable of a hybrid function: one for observation of dim objects against dark backgrounds (e.g. for space domain observations); another for remote sensing applications (e.g. for lunar surface observations). More particularly, the EO signal chain includes a telescope that images light onto a focal plane array (FPA), and electronics capable of fast simple pixel arithmetic and storage. The focal plane array includes a plurality of pixels arranged in rows and columns to form a two-dimensional array. When used to observe the cislunar domain the hybrid sensor is operated in a full frame or flash mode. In the full frame mode, all or most of the pixels are operated to convert light collected during a common exposure period, and to convert the collected light into an electrical charge. When used to observe the lunar surface, the hybrid sensor is operated in a time delay integration (TDI) scanning mode, in which signal accumulated during an exposure period in a row of pixels is added to signal accumulated during a next exposure period by a next row of pixels. Moreover, in the TDI mode of operation, more than one but less than all of rows of pixels in the sensor array are used to capture image data. The electronics can be implemented on the sensor chip, in a connected control circuit chip, and or in an off-chip implementation, such as by a field programmable gate array (FPGA).

Systems in accordance with embodiments of the present disclosure can include a pair of spacecraft, each carrying an instance of the hybrid sensor. Each spacecraft can be placed in a high-eccentricity, high period orbit. The orbit periapsis and apoapsis of the first spacecraft in accordance with at least some embodiments of the present disclosure are at or about 180° apart from those of the second spacecraft. In addition, the first and second spacecraft can be phased at or about 180 degrees apart. This enables a phasing between the hybrid sensor operating modes of the two spacecraft. Depending on the type of mission domain (space or surface looking), careful selection of adequate orbits enables operating with favorable lighting, geometric, and access conditions in each domain.

Additional features and advantages of embodiments of the present disclosure will become more readily apparent from the following description, particularly when taken together with the accompanying drawings.

BRIEF DESCRIPTION OF THE DRAWINGS

FIG. 8 depicts operation of a focal plane array in a time delay integration mode in accordance with embodiments of the present disclosure; and.

DETAILED DESCRIPTION

Figure 1A:
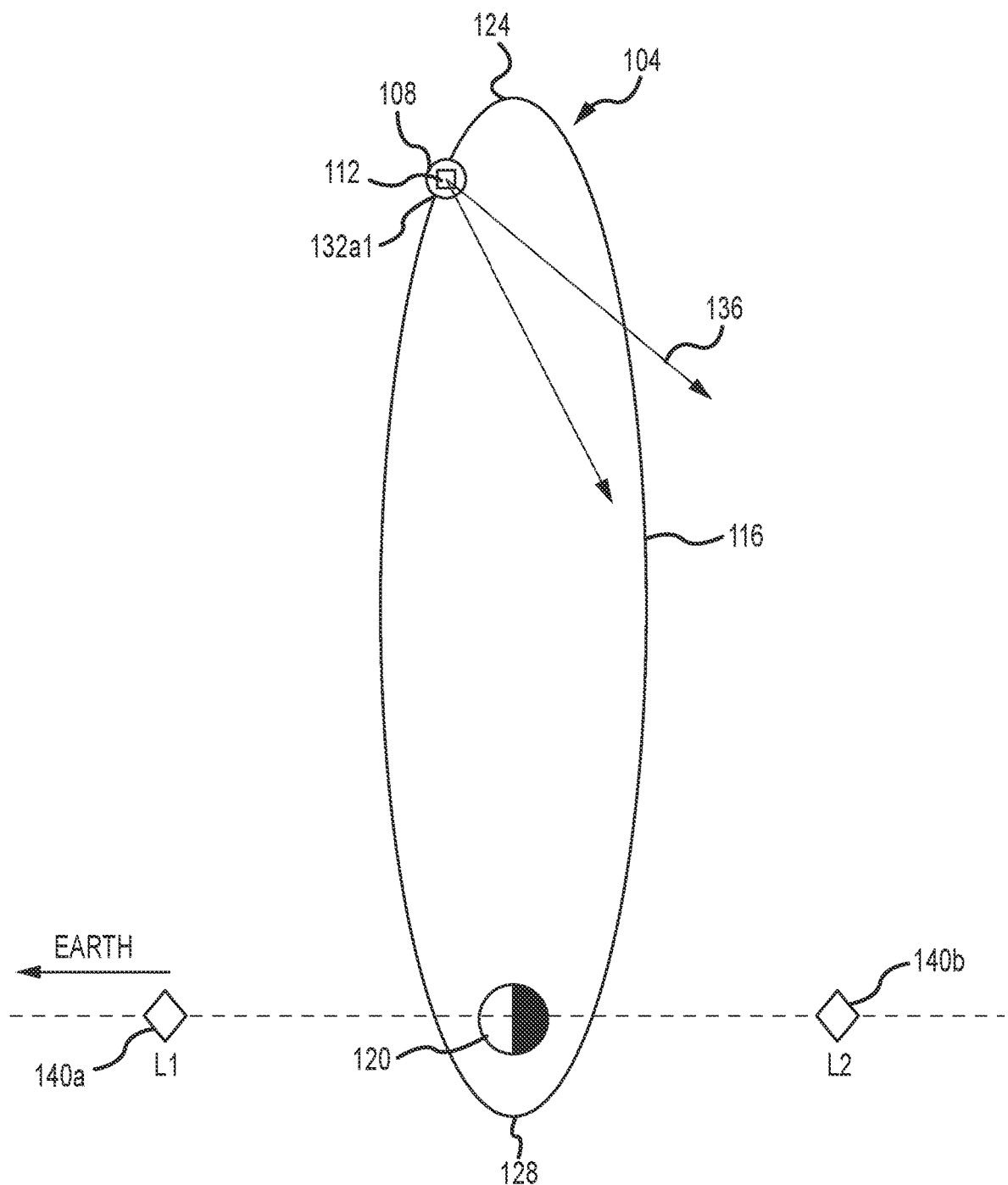
FIGS. 1A and 1B depict a spacecraft in a high-eccentricity, high period orbit in accordance with embodiments of the present disclosure.
Figure 1B:
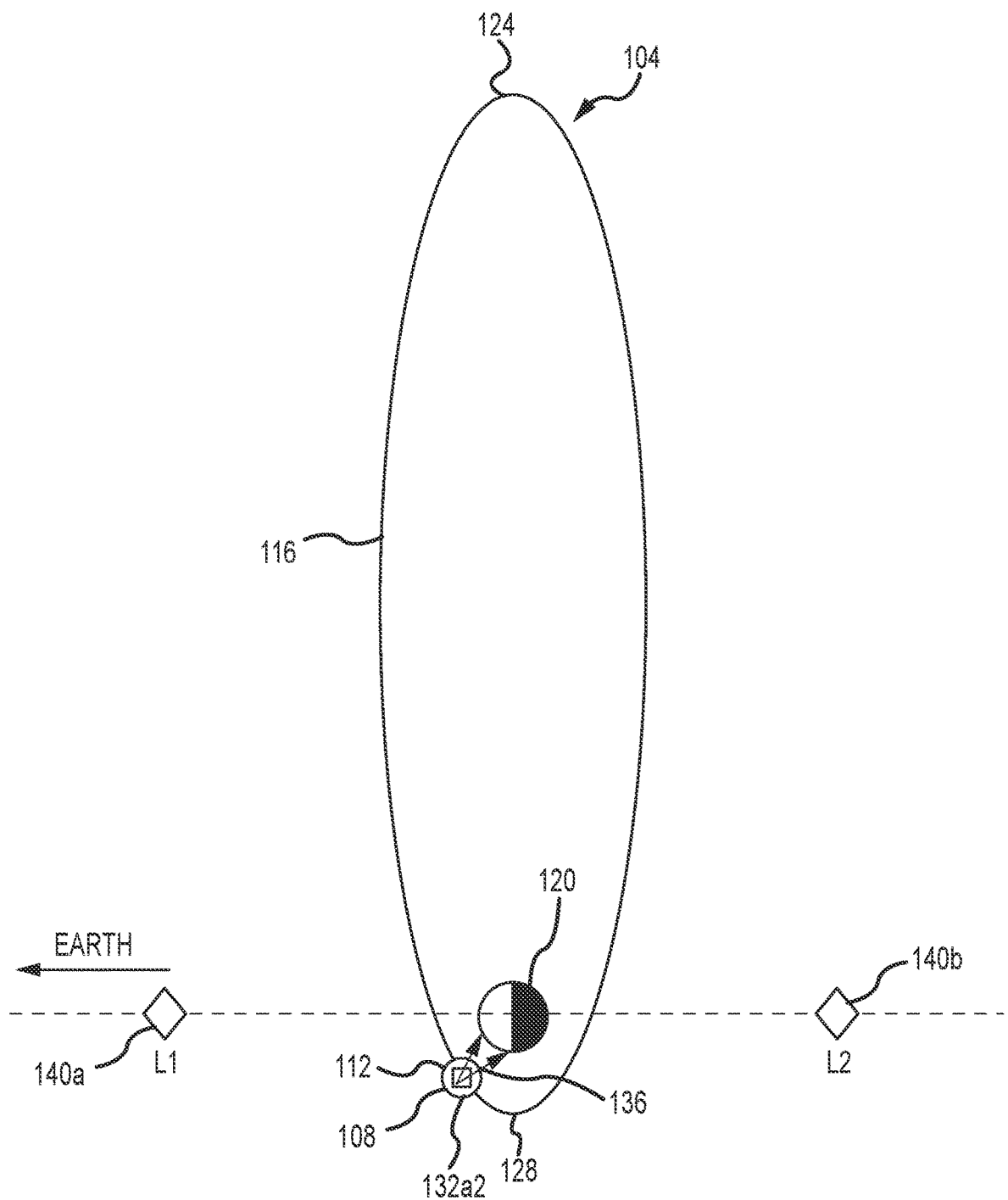

Embodiments of the present disclosure provide systems and methods for monitoring the cislunar space domain and the lunar surface domain. As illustrated in FIGS. 1A and 1B, the orbit 116 of a spacecraft 108 included in an observation system 104 and carrying an imaging instrument or hybrid sensor 112 in accordance with embodiments of the present disclosure is depicted. As shown, the orbit 116 is a high-eccentricity, high period orbit. Also in this example, the celestial object 120 being orbited is the Moon, however systems and methods in accordance with embodiments of the present disclosure can be applied to orbits about other celestial bodies. The use of a high-eccentricity, high-period orbit 116 creates relatively greater geometric spacing between the celestial body 120 and the spacecraft 108 at the orbit apoapsis 124, and relatively reduced geometric spacing between the spacecraft 108 and the celestial body 120 at the periapsis 128.

As illustrated in FIG. 1A, with the spacecraft or spacecraft 108 at a first location 132a1 in the orbit 116 that is at or near the orbit apoapsis 124, a favorable geometry is provided for astronomical-type observations. In particular, the hybrid sensor 112 field of view 136 has unimpeded access and favorable lighting conditions over wide range of astronomical volumes, facilitating observations for purposes that include, but are not limited to, space domain awareness. For instance, at or near the orbit apoapsis 124, the field of view 136 of the instrument 112 can be directed to access the cislunar domain, the Earth, the L1 140a and L2 140b Lagrange points, and deep space, facilitating various missions, including but not limited to space domain awareness missions. As discussed in greater detail elsewhere herein, in accordance with embodiments of the present disclosure, the hybrid sensor 112 can be operated in a staring or full frame mode while being used for space situational awareness purposes.

As illustrated in FIG. 1B, with the spacecraft or satellite 108 at a second location 132a2 in the orbit 116 that is at or near the orbit periapsis 128, the hybrid sensor or instrument 112 is positioned favorably for surface imaging-type observations. In particular, the hybrid sensor 112 is relatively dose to the lunar surface, facilitating high resolution surface imaging. At or near the orbit periapsis 128, the hybrid sensor 112 field of view 136 can be directed to encompass selected portions of the lunar surface for mapping, object detection, or other missions. As discussed in greater detail elsewhere herein, in accordance with embodiments of the present disclosure, the hybrid sensor 112 can operated in a scanning mode when used for surface imaging purposes.

Figure 2:
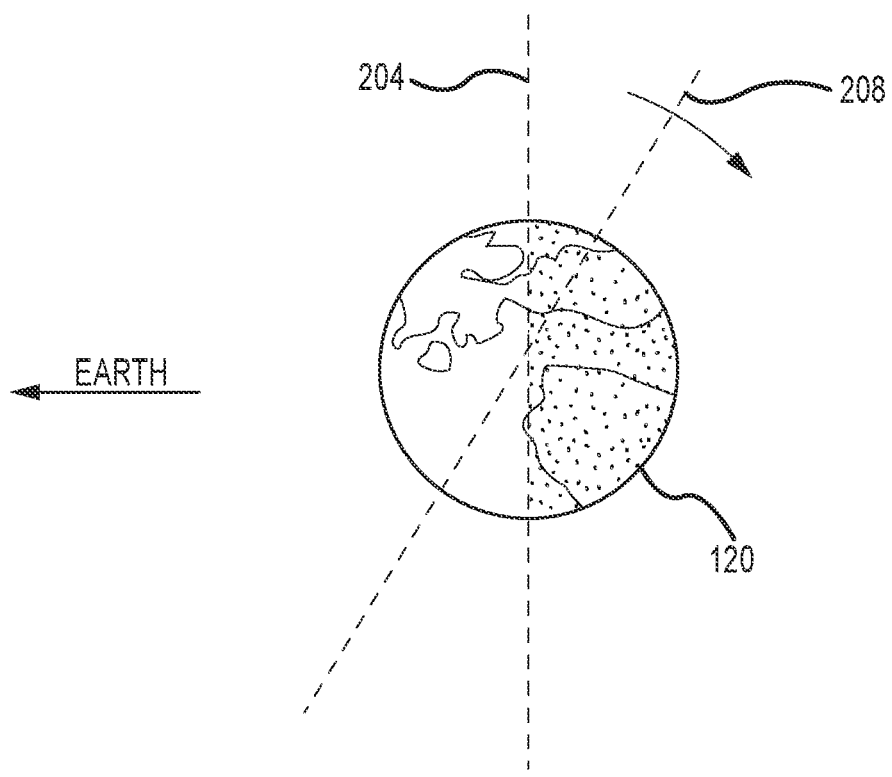
FIG. 2 depicts the effect of orbit size on precession rate, from a polar perspective.

FIG. 2 illustrates that the selection of the orbit 116 period enables control of the precession of the orbit plane around the celestial body 120. Precession of the Observing orbit creates diversity of surface access and provides access to a full hemisphere of the celestial body 120. For example, an inertially fixed polar orbit 204 has full access to the lunar surface every ~27 days (a lunar sidereal period). Alternatively, selecting a near-rectilinear halo orbit (NRHO) 208 creates more favorable geometry (in terms of access and lighting), but at the cost of reduced or no precession of the orbit plane with respect to the surface, and greater distances from the surface of the celestial body 120.

Figure 3:
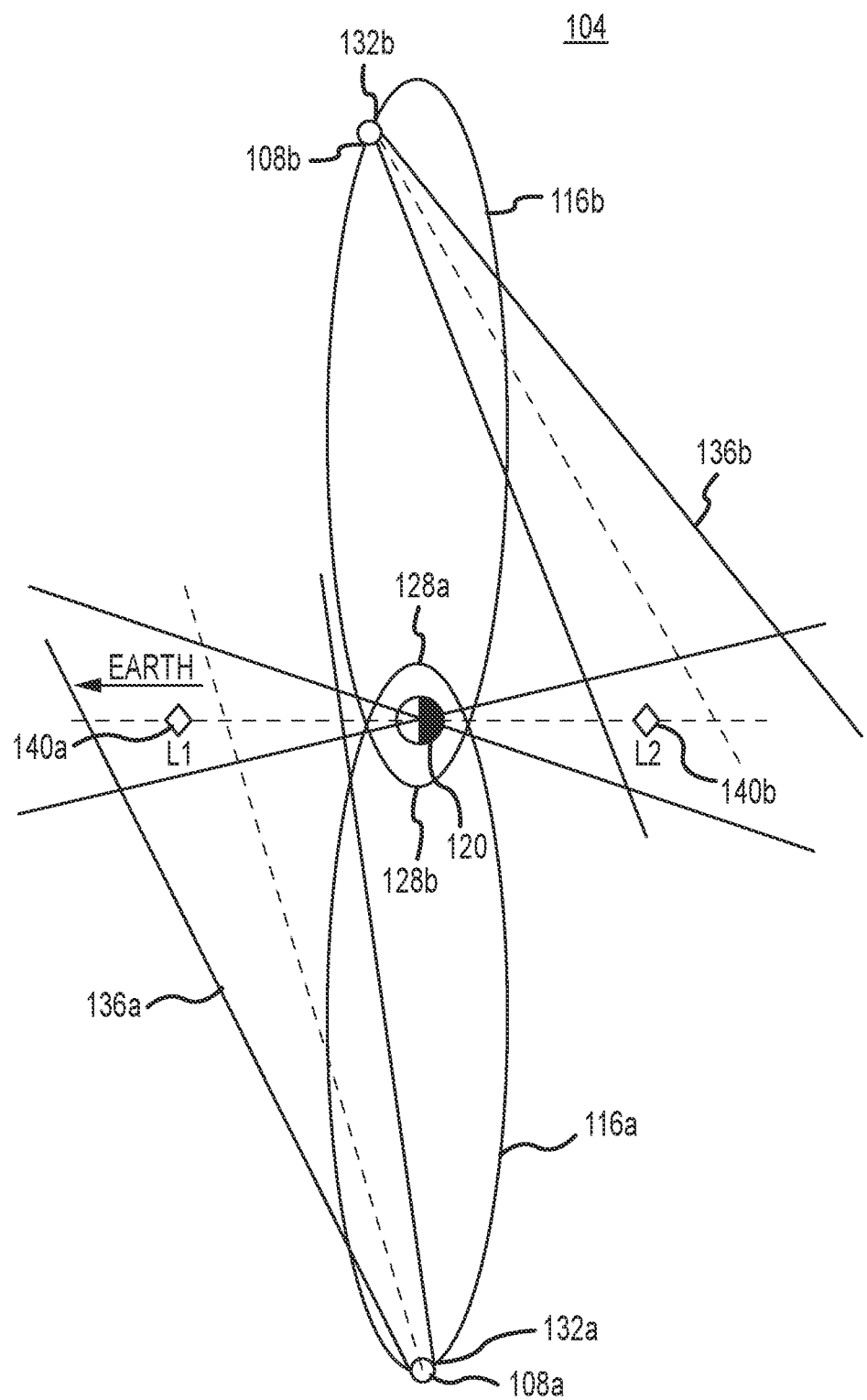
FIG. 3 depicts an observation system incorporating a pair of spacecraft in near-polar orbits with argument of periapsis at 90° and 270° in accordance with embodiments of the present disclosure.

In accordance with at least some embodiments of the present disclosure, the observation system 104 includes a pair of spacecraft 108a and 108b, with each spacecraft 108 carrying an instance of a hybrid sensor 112 that can be operated in staring and time delay integration modes. An example of such an observation system 104 is depicted in FIG. 3. In this example, the first spacecraft 108a is placed in first or "South" orbit 116a, with argument of periapsis 128a at or about 90° (and with argument of apoapsis 124a at or about 270°), and a second spacecraft 108b is placed in a. second or "North" orbit 116b, with argument of periapsis 128b at or about 270° (and with argument of apoapsis 124b at or about 90°), where about is +/--°. As discussed in greater detail elsewhere herein, these generally opposite orbits 116a and 116b, in combination with appropriate phasing of the spacecraft 108a and 108b relative to one another, can provide favorable observational periods. In addition, embodiments of the present disclosure placing a pair of spacecraft 108a and 108b carrying hybrid sensors 112 in high-eccentricity, high-period orbits 116a and 116b at near-polar inclinations with argument of periapsis 90° and 270° about the Moon respectively provide an out-of-sun-Moon-plane geometry at apoapsis 124 that is characterized by favorable lighting conditions. In particular, in this configuration, when looking back towards the space around the Moon, the Sun is roughly at 900 from the line of sight of the hybrid instrument 112. Accordingly, objects in the cislunar domain can be observed more easily. Moreover, between the two spacecraft 108a and 108b and the respective hybrid sensors 112a and 112b, different regions of the space domain and different regions of the lunar surface can be imaged.

Figure 4:
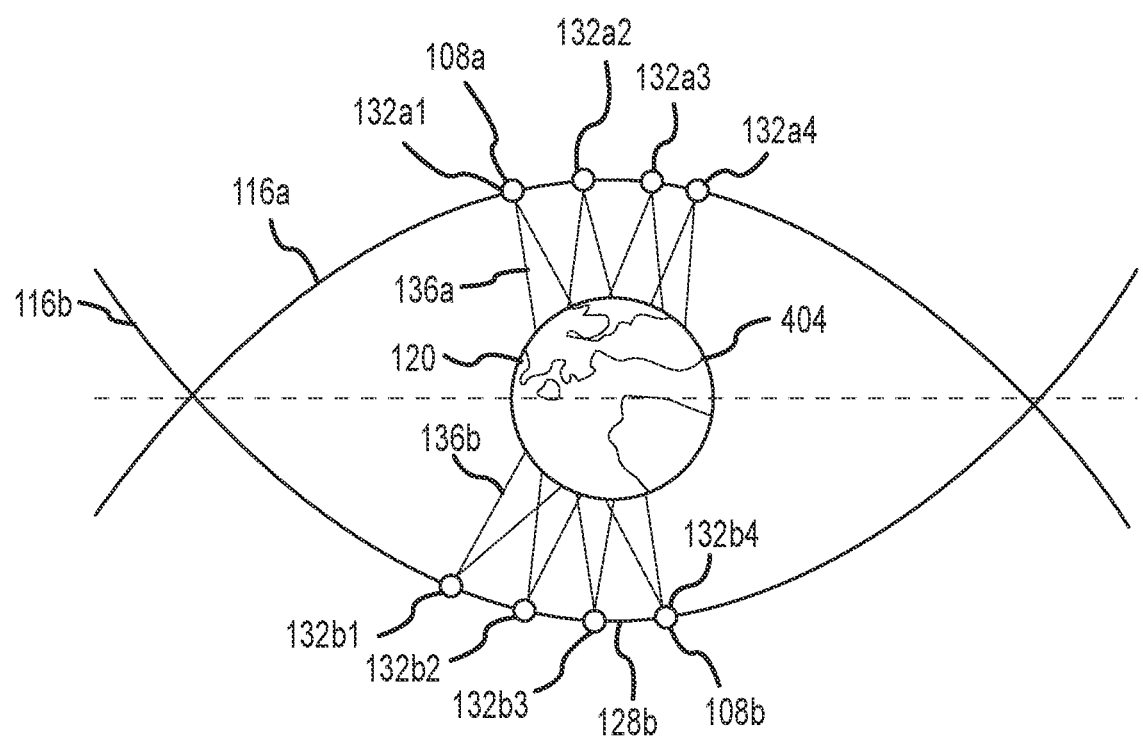
FIG. 4 depicts access to the Lunar surface at periapsis of north and south orbits in accordance with embodiments of the present disclosure.

FIG. 4 depicts the access to the lunar surface 404 provided by the pair of orbits 116a and 116b configured with arguments of periapsis 128a and 128b that are at or about 180° apart (where about is +/-5°), as shown in FIG. 3. In particular, the spacecraft 108a in the South orbit 116a positions the hybrid sensor 112 carried by that spacecraft 108a to make relatively close observations of all or most of the northern hemisphere of the Moon 120, while the spacecraft 108b in the North orbit 116b positions the hybrid sensor 112 carried by that spacecraft 108b to make relatively close observations of all or most of the southern hemisphere of the Moon 120. The field of view 136a of the hybrid sensor 112 carried by the spacecraft 108a in the South orbit 116a encompasses different areas of the Northern hemisphere of the lunar surface 404 as the spacecraft 108a travels through and near the periapsis 124a of the first orbit 116a. Similarly, as shown in connection with the track of the spacecraft 108b in the North orbit 116b, as the spacecraft 108b progresses from a first location 132b 1, a second location 132b2, a third location 132b3, and a fourth location 132b4 in the orbit 116b, the field of view 136b of the spacecraft 108b instrument 112 encompasses different areas of the lunar surface 404. As previously noted, the selection of the orbit size defines either precessing or non-precessing access to lunar surface. Precessing orbits can provide near 100% area access to the Moon surface over some period of time. Accordingly, the observation system 104 incorporating two satellites 108 enables complete surface coverage along a range of meridians.

Figure 5:
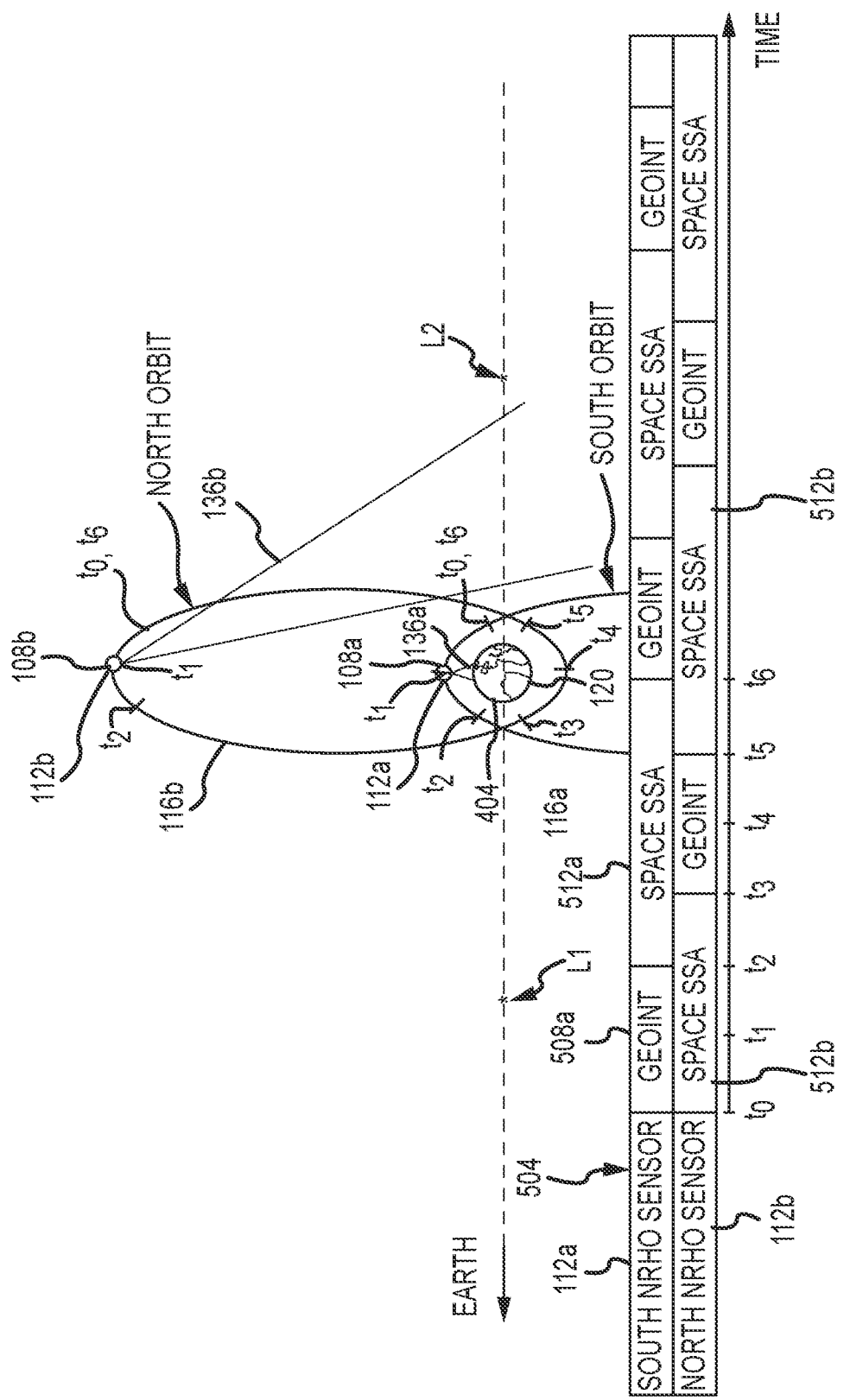
FIG. 5 depicts an orbital phasing of spacecraft in accordance with embodiments of the present disclosure.

FIG. 5 depicts an orbital phasing of spacecraft 108 in an observation system 104 in accordance with embodiments of the present disclosure, and illustrates the observational windows provided by placing two spacecraft 108 on high eccentricity orbits 116 with 180° phasing from each other. As a result of this arrangement, while a first one of the two spacecraft 108a and 108h is close to the lunar surface 404, a second one of the two spacecraft 108a and 108b is distal from the Moon 120. For example, as depicted in the figure, while the first spacecraft 108a is positioned such that the hybrid sensor 112a field of view 136a encompasses portions of the northern hemisphere of the lunar surface 404, the second spacecraft 108b is in a position distal from the lunar surface 404, such that the hybrid sensor 112b field of view 136b has access to a wide area of lunar space, including but not limited to cislunar space. As graphically depicted in the table 504 portion of the figure, this arrangement creates offsets in access times of each observer or hybrid sensor 112 to each of the space and lunar domains.

For example, as depicted in the table 504, at time to the first spacecraft 108a, in the south orbit 116a, has just entered a surface observation phase 508a. During this phase, the first spacecraft 108a is positioned over and in relatively close proximity to the Northern hemisphere of the lunar surface 404, and the included hybrid sensor 112a is in a surface observation mode. Continuing this example and again at time $t_0$, the second spacecraft 108b, in the north orbit 116b, is positioned over the northern hemisphere and at a relatively large distance from the lunar surface 404, and the included hybrid sensor 112b is in a space situational awareness mode during a space situational awareness phase 512b. At time $t_1$, the first 108a and second 108b spacecraft are at the northern most points in their respective orbits 116a and 116b; at this point the hybrid sensor 112a of the first spacecraft 108a remains in the surface observation mode and the second hybrid sensor 112b of the second spacecraft 108b remains in the space situational awareness mode. At time $t_2$, the first spacecraft 108a has moved along the first orbital path 116a to a point at which the distance between the first spacecraft 108a and the lunar surface 404 is increasing, and a space situational awareness phase 512a is entered, during which the first hybrid sensor 112a of the first spacecraft 108a is switched to a space domain or situational awareness mode, while the hybrid sensor 112b of the second spacecraft 108b remains in the space domain observation phase 512b, and thus the hybrid sensor 112b continues to be operated in the space domain observation mode. At time $t_3$, the second spacecraft 108b has moved to a point near the lunar surface 404 and enters a surface observation phase 508b, at which the hybrid sensor 112b of the second spacecraft 108b switches to a surface observation mode, while the first spacecraft 108a. remains in the first space domain observation phase 512a and thus the hybrid sensor 112a of the first spacecraft 108a continues in a space domain observation mode. At time $t_4$, the first 108a and second 108b spacecraft are at the southern most points in their respective orbits 116a and 116b. At time $t_5$, the second spacecraft 108b has moved away from the lunar surface 404 and the hybrid sensor 112b carried by the second spacecraft 108b returns to the space domain observation phase 512b, while the hybrid sensor 112a of the first spacecraft 108a remains in the space domain observation phase 512a. At time $t_6$, the first 108a and second 108b spacecraft have returned to the same relative orbital positions as at time $t_0$. Accordingly, the first spacecraft 108a returns to a surface observation phase 508a, and the hybrid sensor 112a is returned to a surface observation mode, while the second spacecraft remains in the space domain observation phase 512b and the hybrid sensor 112b continues in a space domain awareness mode. This pattern repeats as the spacecraft 108a and 108b continue in their respective orbits 116. As can be appreciated by one of skill in the art after consideration of the present disclosure, subsequent orbits can expose different areas of the lunar surface through precession. Alternatively, the orbits 116 can be fixed. This process can continue for as long as observations of the space domain and/or lunar surface are desired.

Figure 6:
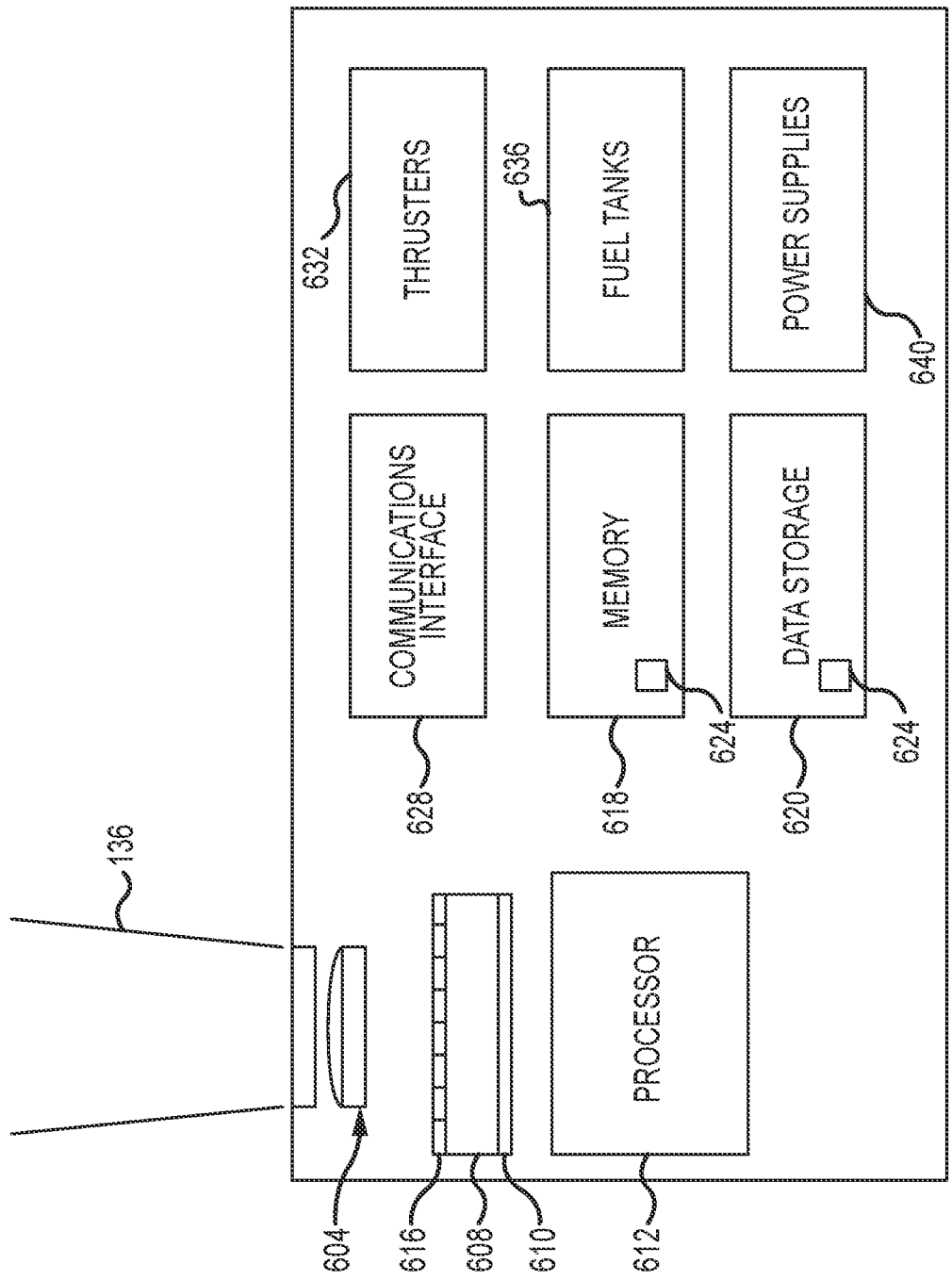
FIG. 6 depicts components of a hybrid sensor in accordance with embodiments of the present disclosure.
Figure 7:
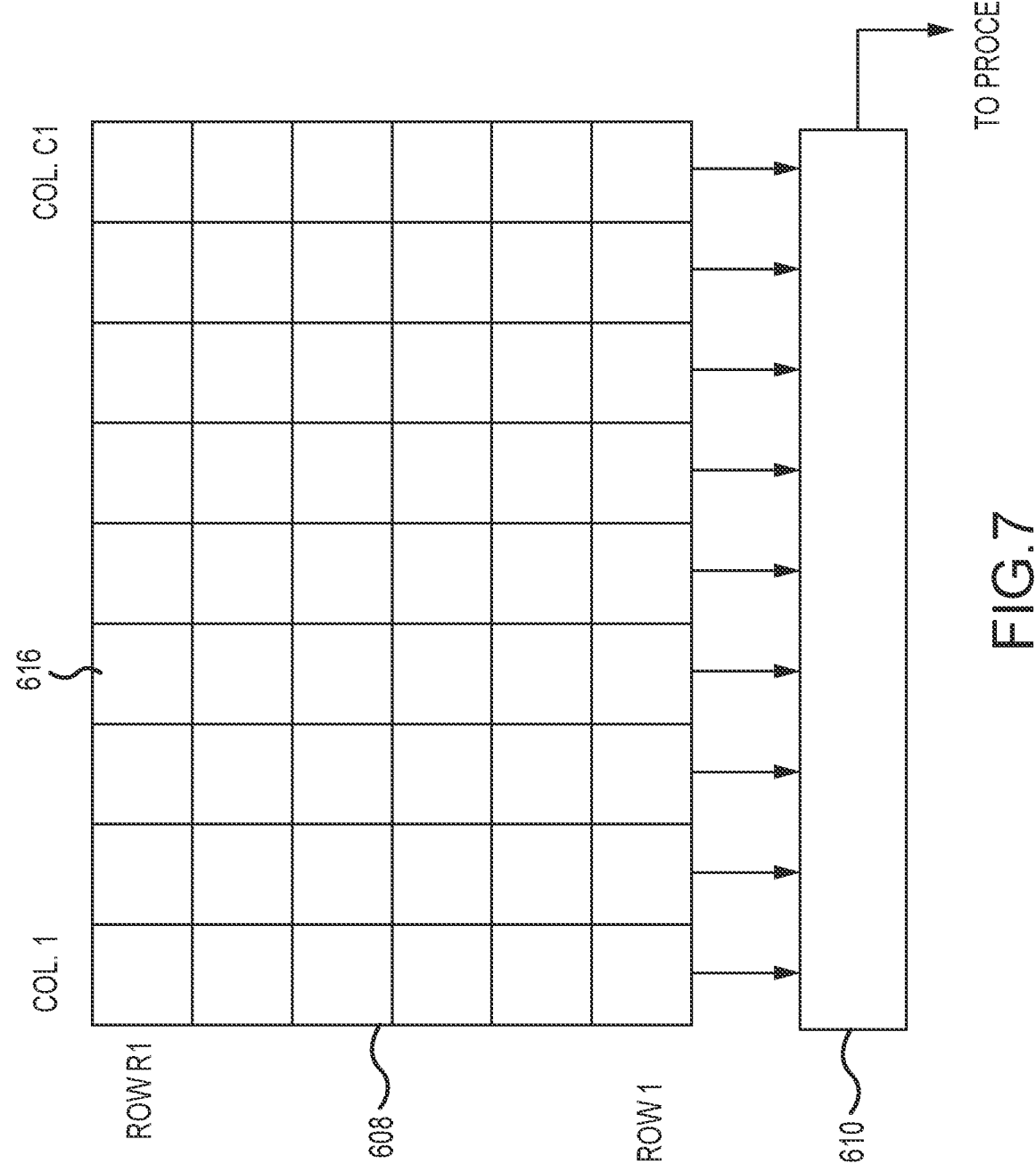
FIG. 7 depicts aspects of a focal plane array architecture in accordance with embodiments of the present disclosure.

FIG. 6 depicts components of a hybrid sensor or instrument 112 in accordance with embodiments of the present disclosure. In general, the hybrid sensor 112 includes an electro-optic signal chain that includes a telescope or optical system 604, a sensor array 608, and a controller or processor 612 that collects incident light from within the field of view 136 of the instrument 112, and that focuses the collected light onto a sensor array 608. The telescope 604 can include reflective, refractive, and/or diffractive optical elements. The sensor array 608 generally includes a plurality of photo sensitive sites or imaging pixels, hereinafter simply referred to as pixels 616, disposed in rows and columns that form an array, and can also include input/output electronics 610 (see FIG. 7). In general, each pixel 616 converts incident photons into electrical charge that is provided to the processor 612, either directly or through one or more amplifiers included as part of the sensor array 608, the input/output electronics 610, or separately. As an example, but without limitation, the sensor array 608 can be provided as a complementary metal oxide semiconductor (CMOS) focal plane array (FPA). Moreover, as discussed in greater detail elsewhere herein, the sensor array 608 can be selectively operated in a framing mode or alternatively in a time delay integration (TDI) or scanning mode. In particular, the sensor array 608 of a hybrid sensor 112 can be operated in a framing mode while the spacecraft 108 carrying the hybrid sensor 112 is in a space domain observation phase 512 of an orbit 116, and in a TDI mode while the spacecraft 108 carrying the hybrid sensor 112 is in a surface observation phase 508 of an orbit 116.

In addition, the instrument 112 components can include various support or other components. The components can include, but are not limited to a memory 618 and data storage 620. The memory 618 can include various components and component types, such as but not limited to random access memory in the form of DRAM or SDRAM. Alternatively or in addition, the instrument 112 components can include data storage 620, such as but not limited to solid state memory, data storage, optical data storage, or magnetic data storage. The memory 618 and/or data storage 620 can function to store operating instructions, application programming, collected image data, calculated data products, tables, or other information or programming (collectively 624 in the figure). As a further example, the instrument 112 components can include a communications interface 628, for example for receiving instructions, transmitting images or other data, or otherwise communicating with other spacecraft, base stations, or the like, As still other examples, the hybrid sensor 112 components can include thrusters 632, fuel tanks 636, power supplies 640, solar panels (not illustrated), and the like.

In accordance with embodiments of the present disclosure, the sensor array 608 is configured to support staring and time delay integration imaging operations. The full frame mode is generally used for space observations and surveillance. The scanning mode is generally used for surface observations and surveillance. Accordingly, the hybrid sensor 112 can be operated in a full-frame mode for space observations and surveillance, and in a scanning mode for surface observations and surveillance.

In a staring imaging operation, also referred to herein as a full frame imaging operation, a plurality of pixels 616 (e.g. most or all of the imaging pixels) included in the sensor array 608 are operated simultaneously or nearly simultaneously to capture an image. That is, charge is generated in the pixels 616 by exposing the pixels 616 to incident light during a common exposure period, The charge can then be transferred from the pixels 616 to the processor 612 or other components, such as by the input/output electronics 610 simultaneously, or on a row by row basis.

In digital time delay integration (TDI) mode, also referred to herein as a scanning mode imaging operation, a set of rows representing a subset of the rows of pixels 616 in the sensor array 608 are operated, and synchronously added in a digital memory as in FIG. 8 and its description below. Moreover, embodiments of the present disclosure provide a sensor array 608 that is capable of performing on-chip time delay integration of image data, or a field programmable gate array (FPGA) or other processor capable of fast pixel arithmetic on data streaming out of the sensor array 608 (off-chip TDI). In accordance with still other embodiments of the present disclosure, the time delay integration of image data is performed using a subset of the available pixels 616 of the sensor 608, The number of rows of pixels 616 over which signals are integrated can be varied, based on the desired amount of signal gain. For example, but without limitation, where the hybrid sensor 112 includes an image sensor array 608 with a 2K×2K array of pixels 616, signals from 64 rows or lines of pixels 616 can be integrated on the image sensor 608 itself. The integrated output is then read out from the 64$^{th}$ line, and can be used to assemble a frame of image data in an off-chip operation, for example performed through execution of programming code or instructions 624 by the processor 612 and the memory 616.

Figure 8:
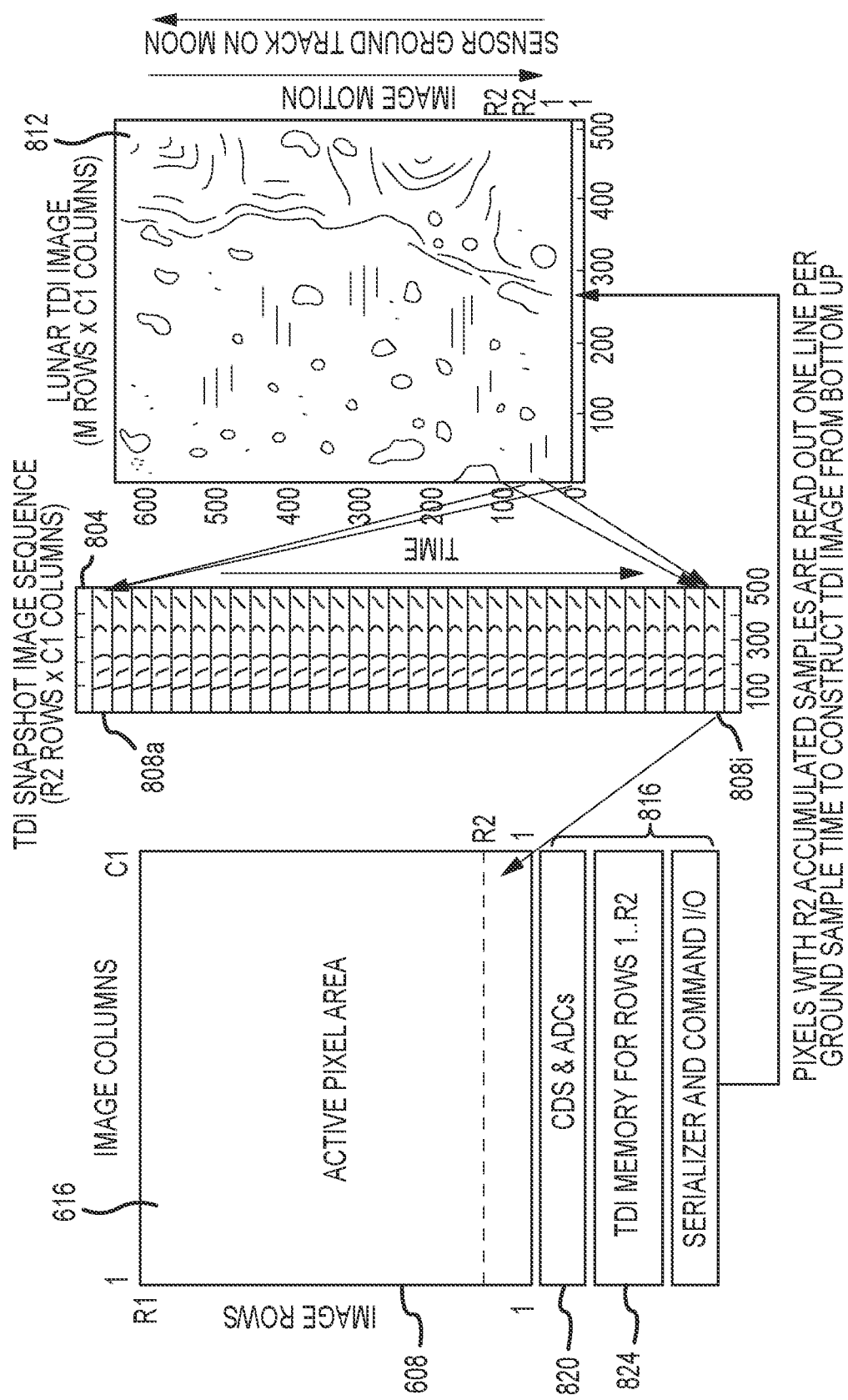

FIG. 8 illustrates aspects of the operation a hybrid sensor 608 in accordance with embodiments of the present disclosure in a TDI mode. In particular, on the left side of the figure, a hybrid sensor array 608 architecture is depicted. As previously discussed, the image sensor 608 generally includes an array of pixels 616 disposed in R1 rows and C1 columns, all or most of which may be utilized to collect data simultaneously in the full frame or staring mode. In the TDI mode, a subset of the rows are utilized. Specifically, for TDI mode imaging of the lunar surface 404, rows 1 through R2 are operated to generate charge from incident light, and are read out at each ground sample time. In accordance with embodiments of the present disclosure R2 is less than R1 (i.e. the number of rows used to accumulate TDI images is less than total number of rows of pixels included in the sensor). Each collection of data from rows 1 through R2. is called a snapshot Specialized timing circuitry synchronizes the time-delay integration time and ground sample times with the apparent rate of travel of the instrument 112 sensor field of view 136 across the lunar surface 404. A row of pixels 616 in the R2 rows collects data from the same area of the lunar surface 404 in each of R2 sequential exposure periods, beginning at row R2 and shifting down by one row per snapshot until the lunar surface element is imaged in row 1, resulting in a time-delay integration time of R2 times the ground sample time In accordance with further embodiments of the present disclosure, the apparent movement of the hybrid sensor 112 relative to the lunar surface 404 and the exposure intervals can be synchronized such that n rows of pixels 616 in the R2 pixels collects data from the same area of the lunar surface 404 in each R2/n sequential exposure periods. The middle frame 804 of the figure depicts a series of snapshots 808a through 808i, each including R2 rows of data. In the right of the figure, an image 812 formed from aggregating a plurality of registered image subframes 808 is depicted. As can be appreciated by one of skill in the art after consideration of the present disclosure, the image 812 of the lunar surface 404 is comprised of C1 columns of pixels 616, and any number of rows of pixels 616.

More particularly, in the center portion 804 of the figure, a time series of TDI snapshots captured each ground sampling time, in order of time from top to bottom, is depicted. Data corresponding to the same TDI output image pixel moves down by one row per ground sample time. The summing process accounts for this motion to accumulate data corresponding to the same TDI output image pixel by shifting by one row per snapshot the corresponding accumulation register into which it is added. Accordingly, embodiments of the present disclosure can perform an on-chip digital summing or integration of signal collected by the rows of pixels. When an output row has accumulated R2 samples, a single row of accumulated data is appended to the output TDI image. Moreover, once the output row has accumulated R2 samples, the data from the output row (the last row in the set of rows used to accumulate the image data) is read out from the sensor, and that one row of integrated data is appended to an image per each subsequent ground sample time. The complete TDI output image can be M rows long, where M>R2 or R1. On the right side of the figure, an example of an output TDI image is depicted. The footprint of the first snapshot in the middle is shown in the area of the lower instance of 1 to R2, and the footprint of the last snapshot is shown in the area of the upper instance of 1 to R2, with TDI row boundaries shown in the corresponding areas. Pixel indices are illustrative, not prescriptive. The roll axis of the hybrid sensor is oriented so that image motion occurs entirely in the vertical direction. In accordance with other embodiments of the present disclosure, the data from all R2 rows of data are read out for each sample time, and rows of sensor data from the same ground location are integrated digitally in a step of post processing.

In this example, the pixels 616 provide an analog output to a set of input/output electronics 816 that are provided as part of the same chip or chip package as the sensor array 608. The input/output electronics 816 can include an integrated correlated double sampling (CDS) and analog to digital converter (ADC) electronics section 820, for converting the analog pixel signals to digital pixel signals. Also included in this example is a time delay integration (TDI) memory 824. The TDI memory 824 enables the creation of an aggregated subframe image in the memory. A serializer and command input/output 828 can be included to provide image sensor 608 output, for example as a serial data stream, to other components of the system, such as the processor 612 for additional processing, the memory 618 or data storage 620 for short or long term storage, and/or to the communications interface 628 for delivery to another system, ground station, or the like, for example via wireless transmission protocols.

Figure 9:
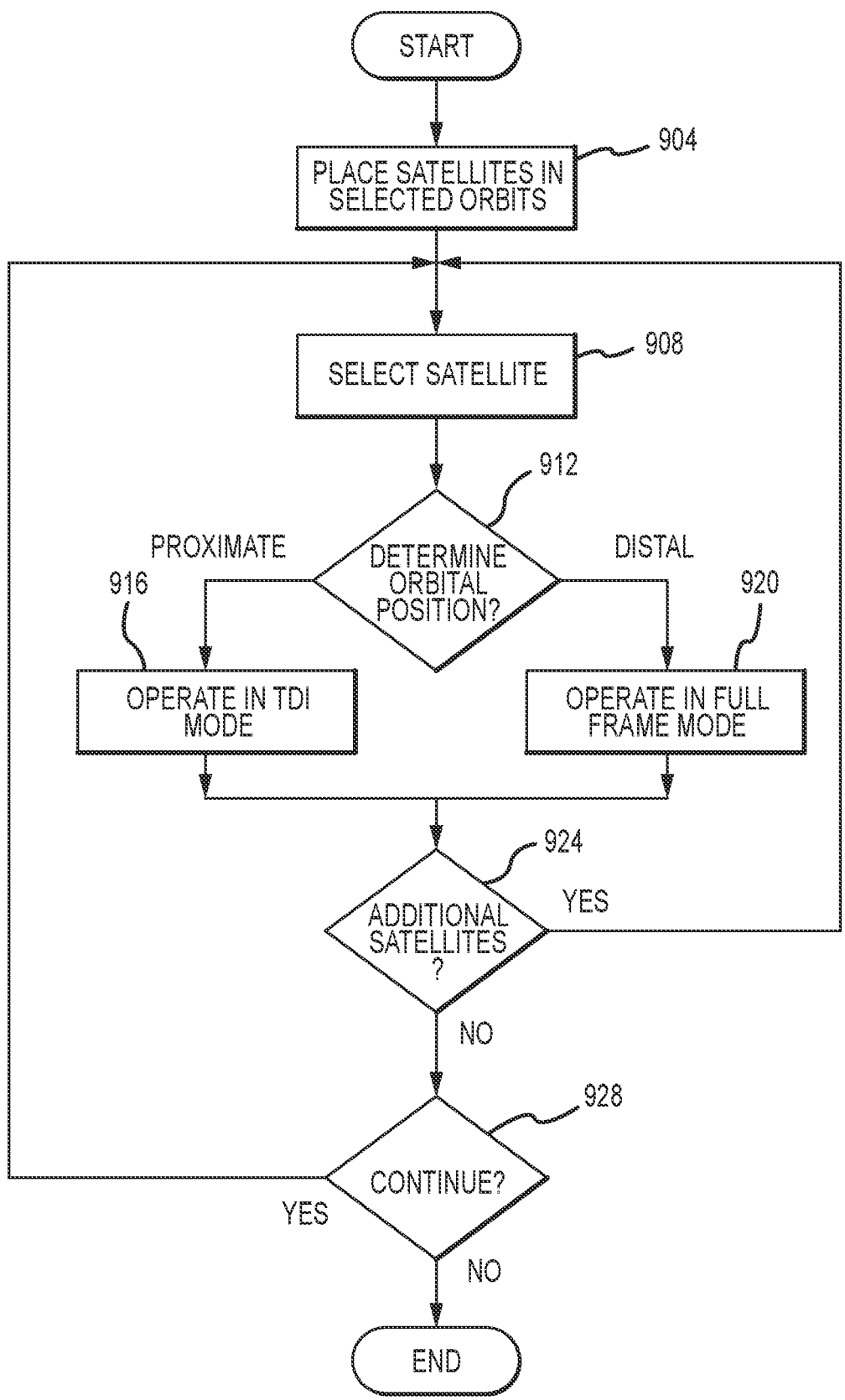
FIG. 9 is a flowchart depicting aspects of the operation of a hybrid sensor in a high-eccentricity orbit in accordance with embodiments of the present disclosure.

With reference now to FIG. 9, aspects of the operation of a hybrid sensor 112 in a high-eccentricity orbit 116 in accordance with embodiments of the present disclosure are depicted. Initially, at step 904, first 108a and second 108b satellites, each carrying a hybrid sensor 112 capable of hybrid operation as discussed herein, are placed in selected orbits 116a and 116b respectively. In accordance with embodiments of the present disclosure, the selected orbits 116 are highly eccentric lunar orbits, with arguments of periapsis at 90° and 270° respectively. In accordance with at least some embodiments of the present disclosure, the orbits are high period, near-polar, lunar-centric orbits. In addition, the satellites 108a and 108b are phased oppositely, such that when the first spacecraft 108a is at the periapsis 128a of its orbit 116a, the second. spacecraft 108b is at the apoapsis 132b of its orbit 116b. As a result, while one spacecraft 108 is proximate to the lunar surface 404 and is performing lunar surface 404 imaging operations, the other spacecraft 108 is distal from the lunar surface 404 and has a clear field of view for performing space domain awareness imaging operations.

At step 908, one of the satellites 108 (e.g. the first spacecraft 108a) is selected. Next, the orbital position of the selected spacecraft 108 is determined (step 912). Where the orbital position of the selected spacecraft 108 is proximate to the lunar surface 404, the hybrid sensor 112 carried by that spacecraft 108 is operated in a TDI mode (step 916). Where the orbital position of the selected spacecraft 108 is distal from the lunar surface 404, the hybrid sensor 112 carried by that spacecraft 108 is operated in a full frame imaging mode (step 920). Whether the orbital position is proximate to or distal from the lunar surface 404 can be determined based on various factors, such as but not limited to desired areas of coverage of the lunar surface 404, a relative urgency between lunar surface and space situational awareness missions, the occurrence or expected occurrence of an event on the lunar surface or in the space domain, or various other considerations. In accordance with still other embodiments, in at least some operating modes, whether the orbital position is proximate to or distal from the lunar surface 404 for purposes of selecting an operating mode of the hybrid sensor 112 can be predetermined based solely on the location of the associated spacecraft 108 within that satellite's orbit 116, for example by reference to a predetermined data set stored in memory 618, such as represented by table 504 illustrated in FIG. 5.

At step 924, a determination is made as to whether there are additional satellites 108 within the observation system 104 for which an assignment of hybrid sensor 112 operating mode remains to be made. If additional satellites 108 are included in the observation system 104, the process returns to step 908, and the next spacecraft 108 (e.g. the second spacecraft 108b) is selected and the process of determining the orbital position and the operating modes of the included hybrid sensor 112 can be performed for that spacecraft 108. Although various examples of systems including two satellites 108 have been discussed, it should be appreciated that an observation system 104 in accordance with embodiments of the present disclosure can include any number of two or more satellites 108.

After a determination that operating modes for the hybrid sensors 112 of all of the satellites 108 in the observation system 104 have been assigned, a determination can be made as to whether operations should continue (step 928). If operations are to continue, the process can return to step 908. Although depicted as a serial operation in various respects in FIG. 9, it should be appreciated that the process of selecting an operating mode for a hybrid sensor 112 carried by a spacecraft 108 in accordance with embodiments of the present disclosure can be performed for each hybrid sensor 112 simultaneously. Accordingly, continuous or nearly continuous monitoring of the orbital positions of the satellites 108 within the observation system 104 and the updating of the operating mode of the hybrid sensors 112 carried by those satellites can be performed.

Embodiments of the present disclosure provide an observation system that incorporates a pair of satellites in high eccentricity, high period, near-polar, lunar-centric orbits, This provides the geometry, lighting, and access for completion of the space domain awareness and lunar surface domain awareness missions. Each satellite carries an instrument having a focal plane array (FPA) incorporating a hybrid telescope design that is capable of operating in full frame (staring) and TDI (scanning) modes. The hybrid instrument enables effective imaging of the space domain while the satellite carrying the instrument is distal from the lunar surface, and further allows effective imaging of the lunar surface while the satellite carrying the instrument is proximate to the lunar surface. In accordance with embodiments of the present disclosure, the satellites are in a high eccentricity, high period, near-polar, orbits about the Moon. The orbits have arguments of periapsis near 90° and 270° respectively, for detecting dim objects such as faint, distant satellites in space situational awareness and providing access to the lunar surface for domain awareness. Moreover, the satellites can be injected into their respective orbits such that their phases are opposite one another, allowing one of the satellites to observe the space domain, while the other one of the satellites is imaging the lunar surface. More particularly embodiments of the present disclosure can include a hybrid focal plane array in a single telescope design that can capture a plurality of satellites and faint objects of interest in a staring mode while also enabling the capture of near-lunar-surface and lunar-surface imaging in a scanning mode. Towards that end, the hybrid focal plane array supports full image framing and line-rate time delay and integration imaging modes.

Embodiments of the present disclosure provide hybrid image sensors 112 as part of the observation instruments carried by spacecraft 108 in orbit about a celestial body, including but not limited to the Moon. More particular, a telescope incorporating an image sensor array capable of hybrid operation (i.e. operation in different modes) is provided. The hybrid sensor supports both full-frame and scanning modes. As can be appreciated by one of skill in the art after consideration of the present disclosure, various modifications of the described systems and methods are possible and are within embodiments of the present disclosure. For example, the hybrid sensor is not limited to any particular set of wavelengths, and can encompass visible, infrared, and ultraviolet wavelengths. The hybrid sensor can also be implemented using any of a variety of technologies, including but not limited to complementary metal oxide semiconductor (CMOS), or any other technology capable of converting incident photons into an electrical charge and reading each pixel of interest out each ground sample time. In addition, an observation system as described herein is not limited to orbits around the Moon, and can instead be employed in connection with various celestial objects. Moreover, an observation system can include more than two satellites 108.

In at least some embodiments of the present disclosure, hybrid FPA operation of a sensor combines some or all of the following features: a 2 dimensional CMOS imaging sensor having an active area of C1 columns by R1 rows; sensor operates in framing mode for deep space SSA observation, so all pixels integrate photon signal over the same interval; the sensor is able to read. out C1 columns by R1 rows in the commanded frame period for space situational awareness (SSA) observations; the sensor is able to operate in readwhile-integrate mode (snapshot). In addition, the sensor has either: on-chip circuitry that can perform time delay and integrate (TDI) signal processing on a subsection (e.g. R2 rows) of the total R1 rows×C1 columns, in which case each line of the output TDI image is transferred off-chip each ground sampling time; or off-chip circuitry that can perform the same arithmetic operations digitally, in which case R2 rows are read out in a ground sampling time and added to previous data by an off-chip processor. The TDI rows R2 (i.e. the rows used to collect image data in a time delay integration mode) is less than the total available rows (R1); and the ground sampling time is the size of the pixel projected on the lunar surface (the ground sampling distance, GSD) divided by the velocity of the ground track. The line rate is the inverse of the ground sampling time. Accordingly, the description herein provides a unique orbital system and a unique sensor that can operate as a large area imaging sensor or a TDI sensor, in which the number of TDI rows is significantly less than the total full frame rows.

The systems and methods disclosed herein can use an imaging CMOS FPA sensor with a hybrid (framing+TDI) capability to define a single telescope design in combination with phased orbit configurations to perform Lunar surface and Lunar space domain awareness missions. The EO chain can include telescope optics, a focal plane array (FPA) sensor, and electronics capable of fast simple pixel arithmetic and storage, either on the sensor chip or off-chip in an FPGA. Accordingly, in a sample application the hybrid sensor provides a camera operating using a subset of the total number of pixels in a time delay integration mode for surface observations and operating as a framing camera for astronomical navigation images.

Embodiments of the present disclosure incorporate high eccentricity, high period, near-polar, lunar-centric orbits with argument of periapsis at 90° and 270° respectively, that provide optimal geometric and lighting conditions and enable space/astronomical access near apoapsis and lunar surface access near periapsis. At apoapsis, the hybrid sensor is used as a framing camera and has access to the Moon, low altitude lunar orbits, L1/L2 libration points, and objects entering the lunar domain through the L1/L2 libration gates. At periapsis, the hybrid camera is used as a TDI camera through subframe stacking and has access to either the northern or southern hemisphere of the lunar surface at extremely low distances (15-100 km), depending on orbit design. In contrast to conventional approaches, embodiments of the present disclosure provide a single telescope design approach and combines it with a selection of orbital configurations and phasing to create 100%-time access to the lunar space domain, ~100% area access to the lunar surface domain, and optimal lighting and geometric viewing conditions for both.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An observation system, comprising:
   a first spacecraft in a first elliptical orbit about a celestial body, the first spacecraft including:
      a first hybrid sensor, the first hybrid sensor having a full frame mode and a scanning mode, wherein the first hybrid sensor is operated in the full frame mode to obtain a first full frame image of a first area of space while the first spacecraft is at or about apoapsis of the first elliptical orbit, and wherein the first hybrid sensor is operated in the scanning mode to obtain a first time domain integration image of a first area of a surface of the celestial body while the first spacecraft is at or about periapsis of the first elliptical orbit, and
   a second spacecraft in a second elliptical orbit about the celestial body, the second spacecraft including:
      a second hybrid sensor, the second hybrid sensor having a full frame mode and a scanning mode, wherein the second hybrid sensor is operated in the full frame mode to obtain a second full frame image of a second area of space while the second spacecraft is at or about apoapsis of the second elliptical orbit, and wherein the second hybrid sensor is operated in the scanning mode to obtain a second time domain integration image of a second area of the surface of the celestial body while the second spacecraft is at or about periapsis of the second elliptical orbit, wherein a periapsis of the first elliptical orbit is spaced from a periapsis of the second elliptical orbit by about 180°, and wherein about is +/−5°.

2. The observation system of claim 1, wherein an argument of periapsis of the first elliptical orbit is 270°, and wherein an argument of periapsis of the second elliptical orbit is 90°.

3. The observation system of claim 2, wherein an orbital phase of the first spacecraft is 180° apart from an orbital phase of the second spacecraft.

4. The observation system of claim 1, wherein an orbital phase of the first spacecraft is 180° apart from an orbital phase of the second spacecraft.

5. The observation system of claim 1, wherein the first and second hybrid sensors each include a focal plane array having R1 rows of imaging pixels, wherein all R1 rows of imaging pixels are utilized in the full frame mode, and wherein R2 rows of imaging pixels are used in the scanning mode.

6. The observation system of claim 5, wherein, while the first hybrid sensor of the first spacecraft is in the scanning mode the second hybrid sensor of the second spacecraft is in the full frame mode.

7. The observation system of claim 6, wherein the celestial body is the Moon.

8. The observation system of claim 1, wherein the first and second hybrid sensors are complementary metal oxide semiconductor (CMOS) focal plane arrays.

9. A method, comprising:
   placing a first spacecraft in a first orbit about a celestial body, wherein the first orbit is elliptical;
   obtaining a first full frame image of a first area of space using a first hybrid sensor carried by the first spacecraft while the first spacecraft is at or about apoapsis of the first orbit; and
   obtaining a first time delay integration (TDI) image of a first area of a surface of the celestial body using the first hybrid sensor carried by the first spacecraft while the first spacecraft is at or about periapsis of the first orbit.

10. The method of claim 9, further comprising:
placing a second spacecraft in a second orbit about the celestial body, wherein the second orbit is elliptical, wherein an orbit periapsis of the first orbit is about 180° apart from an orbit periapsis of the second orbit, and wherein an orbit apoapsis of the first orbit is about 180° apart from an orbit apoapsis of the second orbit;
obtaining a second full frame image of a second area of space using a second hybrid sensor carried by the second spacecraft while the second spacecraft is at or about apoapsis of the second orbit; and
obtaining a second time delay integration (TDI) image of a second area of the surface of the celestial body using the second hybrid sensor carried by the second spacecraft while the second spacecraft is at or about the periapsis of the second orbit.

11. The method of claim 10, wherein the first orbit has an argument of periapsis of between 85° and 95°, and wherein the second orbit has an argument of periapsis of between 265° and 275°.

12. The method of claim 11, wherein the first full frame image of the first area of space is obtained by the first hybrid sensor while the second time delay integration image of the second area of the surface of the celestial body is obtained by the second hybrid sensor, and wherein the second full frame image of the second area of space is obtained by the second hybrid sensor while the first time delay integration image of the first area of the surface of the celestial body is obtained by the first hybrid sensor.

13. The method of claim 12, wherein the first area of space encompassed by the first full frame image obtained by the first hybrid sensor is different than the second area of space encompassed by the second full frame image obtained by the second hybrid sensor, and wherein the first area of the surface of the celestial body is different than and does not include any part of the second area of the surface of the celestial body.

14. The method of claim 11, wherein the celestial body is the Moon.

15. The method of claim 10, wherein the first orbit has an argument of periapsis of 90°, and wherein the second orbit has an argument of periapsis of 270°.

16. The method of claim 13, wherein the first and second hybrid sensors are complementary metal oxide semiconductor (CMOS) image sensors.

17. The method of claim 11, wherein an orbital phase of the first spacecraft is 180° apart from an orbital phase of the second spacecraft.

18. The method of claim 9, wherein the first orbit has an argument of periapsis of between 85° and 95°.

19. The method of claim 9, wherein the first hybrid sensor includes a sensor array having a plurality of rows of pixels and a plurality of columns of pixels,
wherein obtaining the first full frame image of the first area of space includes operating R1 of the rows of pixels simultaneously to capture the first full frame image, and
wherein obtaining the first TDI image of the first area of the surface of the celestial body includes operating R2 of the rows of pixels in sequence to capture the first TDI image,
wherein R2<R1, and
wherein R2>1.

20. The method of claim 19, wherein C1 of the columns of pixels are operated while obtaining the first full frame image, and
wherein C1 of the columns of pixels are operated while obtaining the first TDI image.

* * * * *